United States Patent [19]

Hertel

[11] Patent Number: 4,599,450

[45] Date of Patent: Jul. 8, 1986

[54] PROCESS FOR THE PREPARATION OF ACID NITRO DYESTUFFS

[75] Inventor: Hasso Hertel, Mühlheim am Main, Fed. Rep. of Germany

[73] Assignee: Hoechst Aktiengesellschaft, Fed. Rep. of Germany

[21] Appl. No.: 608,990

[22] Filed: May 10, 1984

[30] Foreign Application Priority Data

May 13, 1983 [DE] Fed. Rep. of Germany ....... 3317471

[51] Int. Cl.$^4$ .............................................. C07C 87/50
[52] U.S. Cl. ....................................... 564/433; 8/436; 8/649; 564/441; 564/442
[58] Field of Search ..................... 8/436, 649; 564/433, 564/441, 442

[56] References Cited

U.S. PATENT DOCUMENTS 1,618,415  2/1927  Ellis .......................................... 8/529
3,909,190  9/1975  Saygin ............................. 260/465 E

FOREIGN PATENT DOCUMENTS 2440206  3/1976  Fed. Rep. of Germany .
1468478  3/1977  United Kingdom .

*Primary Examiner*—A. Lionel Clingman
*Attorney, Agent, or Firm*—Connolly and Hutz

[57] ABSTRACT

Acid nitro dyestuffs are prepared by treating aminonitrodiphenylaminesulfonic acids with an oxidizing agent in an aqueous medium, the oxidizing agent employed being a manganese-(VI) or manganese-(VII) compound and the reaction being carried out at a pH higher than 5 and at a temperature between 20° and 100° C. The dyestuffs thus obtainable dye even fresh full-grained chrome leather in full shades.

20 Claims, No Drawings

PROCESS FOR THE PREPARATION OF ACID NITRO DYESTUFFS

Dyestuffs which were obtained by treating aminonitrodiphenylaminesulfonic acids with manganese dioxide at a pH higher than 6 and elevated temperatures are described in British Patent Specification No. 1,468,478. They are used for dyeing leather.

The mode of tanning leather is of decisive importance for its tinctorial behavior. The most important tanning method nowadays is tanning with chromium salts—according to the literature (for example Ullmanns Encyklopädie der technischen Chemie ("Ullmann's Encyclopedia of Industrial Chemistry"), 4th edition, volume 16, page 120) about 80% of all the leather produced is at least partly chrome-tanned.

The dyestuffs of said British Patent Specification No. 1,468,478 produce dyeings in full shades on intermediately dried chrome leather splits or on intermediately dried, after-chromed, vegetable-tanned leather. However, only very pale dyeings are obtained on fresh chrome leather, such as, for example, box calf. Accordingly, this type of leather, which is very important industrially, cannot be dyed satisfactorily with the dyestuffs mentioned.

It has now been found that acid nitro dyestuffs having an improved tinctorial power are obtained if the treatment of the aminonitrodiphenylaminesulfonic acid is carried out with an inorganic manganese-(VI) or manganese-(VII) compound instead of manganese dioxide. Such dyestuffs also enable fresh full-grained chrome leather to be dyed in full shades.

The present invention therefore relates to a process for the preparation of acid nitro dyestuffs by treating one or more aminonitrodiphenylaminesulfonic acids with an oxidizing agent in an aqueous medium, wherein the oxidizing agent employed is an inorganic manganese-(VI) or manganese-(VII) compound, and the formation of the dyestuffs is carried out at a pH higher than 5 and at a temperature between 20° and 100° C.

The process according to the invention is preferably carried out at a pH between 6.5 and 10.5 and preferably at a temperature between 50° and 80° C. The manganese-(VI) or manganese-(VII) compound employed in accordance with the invention is preferably employed in an amount of 0.2 to 2 moles per mole of aminonitrodiphenylaminesulfonic acid.

The aminonitrodiphenylaminesulfonic acids used as the starting compounds can contain, in the aromatic nuclei, further substituents which are customary for such compounds to be used for the preparation of acid nitro dyestuffs; such substituents are preferably halogen atoms, such as chlorine and bromine atoms, alkyl groups, particularly those having 1 to 4 carbon atoms, alkoxy groups, particularly those having 1 to 4 carbon atoms, and carboxy groups.

As a rule, the process according to the invention is carried out by adding one or more of the manganese compounds used in accordance with the invention as oxidizing agents to an aqueous solution having a pH higher than 5, preferably between 6.5 and 10.5, and a temperature between 20° and 100° C., preferably between 50° and 80° C., and containing one or more starting aminonitrodiphenylaminesulfonic acids, and heating the reaction mixture for some hours at an elevated temperature, such as a temperature between 50° and 100° C., preferably between 50° and 80° C., while maintaining the pH range indicated and selected, for example by adding an acid. When the reaction is complete, the mixture of dyestuffs formed is isolated by spray drying or by salting out and filtering off with suction, it being possible in the last-mentioned case to carry out the necessary drying, for example, in a stream of warm air.

Manganese-(VI) and manganese-(VII) compounds which are used as oxidizing agents in accordance with the invention are preferably the alkali metal and alkaline earth metal salts, such as, especially, sodium, potassium and calcium salts, of manganic acid and of permanganic acid. The oxidizing agents used in accordance with the invention are preferably potassium manganate, sodium manganate and sodium permanganate and, especially, potassium permanganate.

Examples of aminonitrodiphenylaminesulfonic acids which are used as starting compounds for the preparation of the acid nitro dyestuffs are 4-amino-4'-nitrodiphenylamine-2'-sulfonic acid, 4-amino-2'-nitrodiphenylamine-4'-sulfonic acid, 4-amino-2',4'-dinitrodiphenylamine-6'-sulfonic acid, 4-amino-2',6'-dinitrodiphenylamine-4'-sulfonic acid and 3-amino-4'-nitrodiphenylamine-2'-sulfonic acid and also these compounds substituted in one or both benzene nuclei by one or two, preferably one, substituents, these substituents being selected from the group comprising halogen atoms, such as chlorine or bromine atoms, alkyl groups having preferably 1 to 4 carbon atoms, alkoxy groups having preferably 1 to 4 carbon atoms and carboxy groups, for example 5-chloro-4-amino-4'-nitrodiphenylamine-2'-sulfonic acid, 5-chloro-4-amino-2'-nitrodiphenylamine-4'-sulfonic acid, 4-amino-3-methyl-4'-nitrodiphenylamine-2'-sulfonic acid, 4-amino-3-methyl-2'-nitrodiphenylamine-4'-sulfonic acid, 4-amino-3-methoxy-4'-nitrodiphenylamine-2'-sulfonic acid, 4-amino-3-methoxy-2'-nitrodiphenylamine-4'-sulfonic acid, 3-amino-2'-nitrodiphenylamine-4'-sulfonic acid, 4-chloro-3-amino-4'-nitrodiphenylamine-2'-sulfonic acid, 4-chloro-3-amino-2'-nitrodiphenylamine-4'-sulfonic acid, 3-amino-4-methyl-4'-nitrodiphenylamine-2'-sulfonic acid, 3-amino-4-methyl-2'-nitrodiphenylamine-4'-sulfonic acid, 3-amino-4-methoxy-4'-nitrodiphenylamine-2'-sulfonic acid and 3-amino-4-methoxy-2'-nitrodiphenylamine-4'-sulfonic acid.

The starting compounds used in the process according to the invention are preferably aminonitrodiphenylaminesulfonic acids of the general formula (1)

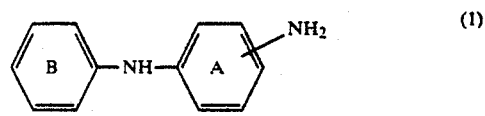

in which the amino group present in the benzene nucleus A is attached to the benzene nucleus in the meta-position or para-position, and the benzene nucleus B is substituted by one or two nitro groups and one sulfo group, these groups being attached to the nucleus B in the ortho-position and para-position, and in which the benzene nuclei A and B can also each contain one or two substituents selected from the group comprising halogen, such as bromine and especially chlorine, alkyl having 1 to 4 carbon atoms, such as ethyl and methyl, alkoxy having 1 to 4 carbon atoms, such as ethoxy and methoxy, and carboxy. The amino group in the benzene nucleus A is preferably in the para-position relative to the amino group of the diphenylamine.

The acid nitro dyestuffs which can be obtained in accordance with the invention are very readily soluble in warm and cold water. They are suitable for dyeing leather, particularly for dyeing chrome leather of a very wide variety of modes of preparation, such as intermediately dried chrome leather, for example chrome leather splits, fresh chrome leather, for example box calf or chrome side leather, or mixed chrome-tanned and vegetable-tanned leather, such as after-chromed sheep leather subjected to preliminary vegetable tanning. They are also suitable for dyeing aluminum-tanned or zirconium-tanned leathers.

The dyestuffs which can be obtained in accordance with the invention, dye the leather thoroughly. Their tinctorial strength is high compared with other nitro dyestuffs. Their fastness properties, such as, for example, fastness to light, fat-liquoring and solvents, are good.

The dyestuffs are used and dyeings are produced by means of these dyestuffs in a customary manner. Drum-dyeing is particularly suitable for producing dyeings. In this process, after being freed from acids or wetted back, the leather is agitated in a liquor containing the dyestuff and, if appropriate, a small amount of a weak base, such as ammonia, and/or an anionic surfactant. A fat-liquor is then added in a customary manner in order to soften the leather, and, after the fat-liquor has been soaked back the bath is rendered slightly acid, formic acid being usually employed for this purpose.

It is also possible, however, to produce dyeings by brushing or spraying, for which purpose use is made, for example, of a dye liquor which, besides the dyestuff, also contains ammonia, such as, for instance, 25% strength ammonia, an anionic surfactant and, for instance, 10% of ethanol.

The examples which follow serve to illustrate the invention. The parts are parts by weight and the percentage data relate to percentages by weight, unless a note is made to the contrary.

EXAMPLE 1

307 parts of 4'-nitro-4-aminodiphenylamine-6'-sulfonic acid are stirred with 2,500 parts of water at 50° C. The free acid is converted into the sodium salt and the pH adjusted to a value of 9.0 by adding approximately 125 parts of 32% strength aqueous sodium hydroxide solution. 75 parts of potassium permanganate are then introduced. As a result of the heat evolved in the reaction, the temperature rises rapidly to about 60° C. The pH begins to increase; but it is kept at a value of 9 by adding a few parts of acetic acid. After half an hour, the temperature is raised to 80° C. and is kept there for five hours.

In order to remove insoluble matter, the mixture is filtered with suction through a filter covered with kieselguhr, and the filtrate and wash water are converted into a dyestuff powder in a spray drier. This powder dyes leather—including fresh full-grained chrome leather—in a full shade of medium brown.

EXAMPLE 2

307 parts of 4'-nitro-4-aminodiphenylamine-6'-sulfonic acid are stirred with 1,600 parts of water and half converted into the sodium salt by adding 60.6 parts of 33% strength aqueous sodium hydroxide solution. A pH of 6 is set up. 75 parts of potassium permanganate are then introduced in the space of 30 minutes. The pH value rises to about 8. The temperature is increased to 75° C. and is kept there for six hours. Working up is carried out as in Example 1. The resulting dyestuff powder has good tinctorial properties, similar to the powder of Example 1.

EXAMPLE 3

The procedure followed is as in Example 2, but the potassium permanganate is added in the form of an approximately 8% strength solution, warmed to about 30° C. A dyestuff powder is obtained, which has good and advantageous dyeing properties similar to those of the powder of Examples 1 and 2.

EXAMPLE 4

The procedure followed is as in Example 1, but 140 parts of potassium manganate are added instead of the potassium permanganate. A dyestuff powder which has good dyeing properties similar to those of the powder of Example 1 is obtained.

EXAMPLE 5

The pH of a solution of 343 parts of the sodium salt of 4'-nitro-4-amino-3-methyldiphenylamine-6'-sulfonic acid in 1,600 parts of water, warmed to 60° C., is adjusted to a value of 8.0. 80 parts of potassium permanganate are introduced in the course of 10–15 minutes. The temperature rises by approx. 20° C. and is initially kept at this level after the heat evolved in the reaction has died away; the pH is also kept at 8.0 by adding dilute sulfuric acid. When, after about 3 hours, the reaction is complete, the mixture is clarified by being filtered with suction through kieselguhr, and the filtrate is then salted out at approx. 40° C. by means of an amount of sodium chloride of about 20% by volume, relative to the volume of the filtrate. The dyestuff which has been precipitated is filtered off with suction, dried and ground. It dyes leather in slightly reddish-tinged medium brown shades.

EXAMPLE 6

321 parts of 4'-nitro-4-amino-3-methyldiphenylamine-6'-sulfonic acid are stirred with 2,200 parts of water at 55° C. 60.6 parts of 33% strength aqueous sodium hydroxide solution are added. A pH of 6 is set up. 75 parts of potassium permanganate are introduced, as a result of which the temperature rises by approx. 12° C. and the pH increases to 7.5. After 30 minutes, the temperature is raised to 90° C. and is kept at that level for two hours. The mixture is cooled and clarified through kieselguhr, and the filtrate is spray-dried. The dyestuff powder obtained dyes leather in as good a manner as the dyestuff powder which can be obtained in accordance with Example 5.

EXAMPLE 7

A dyestuff having properties as good as those of the dyestuff of Example 5 is obtained if the procedure is as indicated in Example 5, but 140 parts of potassium permanganate are used instead of 80 parts of potassium permanganate and the pH is kept at a value of 9 by adding acetic acid.

EXAMPLE 8

If the procedure is as indicated in Example 1, but an equivalent amount of 4'-nitro-3-amino-4-methyldiphenylamine-6'-sulfonic acid is used instead of 4'-nitro-4-aminodiphenylamine-6'-sulfonic acid, and twice the amount of potassium permanganate is used, a dyestuff is obtained which dyes leather in a strong, very yellow-tinged pale brown.

EXAMPLE 9

The procedure is as in Example 1, but only sufficient sodium hydroxide solution to give a pH of 5.5 is added, this pH being maintained, during and after the introduction of potassium permanganate, by adding 25% strength aqueous sulfuric acid dropwise.

The dyestuff powder obtained dyes leather in olive-brown shades.

USE EXAMPLE 1

The following procedure is employed in order to produce a dyeing on box calf:

10 parts of calf leather (shaved weight) which has been tanned with a commercially available chrome tanning substance is agitated for 30 minutes, and freed from acid, in a drum in a bath composed of 30 parts of water, 0.04 part of sodium acetate and 0.04 part of sodium bicarbonate. It is then introduced into a fresh bath composed of 30 parts of water and 0.05 part of an acid nitro dyestuff according to the invention. It is agitated in this bath for 20 minutes, 0.2 part of an oil/fat-liquor mixture is then added, and 0.02 part of 85% strength aqueous formic acid is added after a further 30 minutes. After 30 minutes, the leather is taken out, rinsed, dried and staked. The temperature of the bath is approx. 50° C. in each case.

USE EXAMPLE 2

The following procedure is used to produce a dyeing on split velour: 5 parts of dry, buffed chrome side splits are wetted back by being agitated for 2 hours in a drum in a bath composed of 50 parts of water, 0.05 part of 25% strength aqueous ammonia and 0.04 part of tributylphenyl nonaglycol ether. The leather is then introduced into a fresh bath composed of 40 parts of water, 0.04 part of 25% strength aqueous ammonia and 0.125 part of a dyestuff according to the invention, and is agitated in this bath for 90 minutes. 0.1 part of fat-liquor is added, followed, after 30 minutes, by 0.125 part of 85% strength aqueous formic acid. After 30 minutes, the leather is taken out, rinsed, dried and staked. The bath temperature is approx. 50° C. in each case.

USE EXAMPLE 3

The following procedure is employed in order to produce a dyeing on vegetable-tanned, after-chromed garment velour: 5 parts of leather of this type made from Persians are wetted back by being treated in a drum for 90 minutes in a bath composed of 50 parts of water, 0.05 part of 25% strength aqueous ammonia and 0.05 part of a nonylphenol polyglycol ether (or a similar nonionic surfactant). The bath is then drained off and replaced by a new bath composed of 40 parts of water and 0.25 part of a dyestuff according to the invention. The leather is agitated in this bath for 60 minutes, 0.125 part of a fat-liquor is then added to the bath, and, after a further 30 minutes, 0.25 part of 85% strength aqueous formic acid is also added. After 30 minutes, the leather is taken out, rinsed, dried and staked. The bath temperature is approx. 50° C. in each case.

In all the use examples, strong brown dyeings of good fastness properties are obtained using the acid nitro dyestuffs according to the invention (or which can be obtained in accordance with the invention).

I claim:

1. A process for the preparation of acid nitro dyestuffs by treating an aminonitrodiphenylaminesulfonic acid with an oxidizing agent in an aqueous medium, wherein the oxidizing agent employed is a manganese-(VI) or manganese-(VII) compound, and the reaction is carried out at a pH higher than 5 and at a temperature between 20° and 100° C.

2. The process as claimed in claim 1, wherein the reaction is carried out at a pH between 6.5 and 10.5.

3. The process as claimed in claim 1, wherein the manganese-(VI) or manganese-(VII) compound is employed in an amount of 0.2 to 2 moles per mole of aminonitrodiphenylaminesulfonic acid.

4. The process as claimed in claim 1, wherein the starting aminonitrodiphenylaminesulfonic acid is a compound of the formula (1)

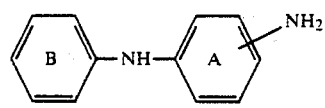

in which the amino group present in the benzene nucleus A is attached to the benzene nucleus in the meta-position or para-position, and the benzene nucleus B is substituted by one or two nitro groups and one sulfo group, these groups being attached to the nucleus B in the ortho-position and para-position, and in which the benzene nuclei A and B can each additionally contain in one or two substituents selected from the group consisting of halogen, alkyl of 1 to 4 C-atoms, alkoxy of 1 to 4 C-atoms and carboxy.

5. The process as claimed in claim 1, wherein the starting aminonitrodiphenylaminesulfonic acid is 4-amino-4'-nitrodiphenylamine-2'-sulfonic acid, 4-amino- 2'-nitrodiphenylamine-4'-sulfonic acid, 4-amino-2',4'-dinitrodiphenylamine-6'-sulfonic acid, 4-amino-2',6'-dinitrodiphenylamine-4'-sulfonic acid, 3-amino-4'-nitrodiphenylamine-2'-sulfonic acid, 5-chloro-4-amino-4'-nitrodiphenylamine-2'-sulfonic acid, 5-chloro-4-amino-2'-nitrodiphenylamine-4'-sulfonic acid, 4-amino-3-methyl-4'-nitrodiphenylamine-2'-sulfonic acid, 4-amino-3-methyl-2'-nitrodiphenylamine-4'-sulfonic acid, 4-amino-3-methoxy-4'-nitrodiphenylamine-2'-sulfonic acid, 4-amino-3-methoxy-2'-nitrodiphenylamine-4'-sulfonic acid, 3-amino-2'-nitrodiphenylamine-4'-sulfonic acid, 4-chloro-3-amino-4'-nitrodiphenylamine-2'-sulfonic acid, 4-chloro-3-amino-2'-nitrodiphenylamine-4'-sulfonic acid, 3-amino-4-methyl-4'-nitrodiphenylamine-2'-sulfonic acid, 3-amino-4-methyl-2'-nitrodiphenylamine-4'-sulfonic acid, 3-amino-4-methoxy-4'-nitrodiphenylamine-2'-sulfonic acid or 3-amino-4-methoxy-2'-nitrodiphenylamine-4'-sulfonic acid or a mixture of these compounds.

6. The process as claimed in claim 1, wherein the starting aminonitrodiphenylaminesulfonic acid is 4-amino-4'-nitrodiphenylamine-2'-sulfonic acid, 4-amino-2'-nitrodiphenylamine-4'-sulfonic acid, 4-amino-2',4'-dinitrodiphenylamine-6'-sulfonic acid, 4-amino-2',6'-dinitrodiphenylamine-4'-sulfonic acid or 3-amino-4'-nitrodiphenylamine-2'-sulfonic acid or a mixture of these compounds.

7. The process as claimed in claim 1, wherein the starting aminonitrodiphenylaminesulfonic acid is a 4-amino-(nitrodiphenylaminesulfonic acid).

8. The process as claimed in claim 1, wherein the oxidizing agent used is potassium permanganate.

9. Acid nitro dyestuffs which are obtainable by the process of claim 1.

10. The process as claimed in claim 2, wherein the manganese-(VI) or manganese-(VII) compound is employed in an amount of 0.2 to 2 moles per mole of aminonitrodiphenylaminesulfonic acid.

11. The process as claimed in claim 2, wherein the starting aminonitrodiphenylaminesulfonic acid is a compound of the formula (1),

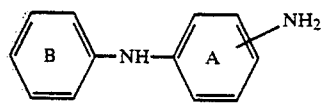 (1)

in which the amino group present in the benzene nucleus A is attached to the benzene nucleus in the meta-position or para-position, and the benzene nucleus B is substituted by one or two nitro groups and one sulfo group, these groups being attached to the nucleus B in the ortho-position and para-position, and in which the benzene nuclei A and B can each additionally contain one or two substituents selected from the group consisting of halogen, alkyl of 1 to 4 carbon atoms, alkoxy of 1 to 4 carbon atoms and carboxy.

12. The process as claimed in claim 3, wherein the starting aminonitrodiphenylaminesulfonic acid is a compound of the formula (1),

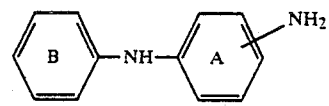 (1)

in which the amino group present in the benzene nucleus A is attached to the benzene nucleus in the meta-position or para-position, and the benzene nucleus B is substituted by one or two nitro groups and one sulfo group, these groups being attached to the nucleus B in the ortho-position and para-position, and in which the benzene nuclei A and B can each additionally contain one or two substituents selected from the group consisting of halogen, alkyl of 1 to 4 carbon atoms, alkoxy of 1 to 4 carbon atoms and carboxy.

13. The process as claimed in claim 2, wherein the starting aminonitrodiphenylaminesulfonic acid is 4-amino-4'-nitrodiphenylamine-2'-sulfonic acid, 4-amino-2'-nitrodiphenylamine-4'-sulfonic acid, 4-amino-2',4'-dinitrodiphenylamine-6'-sulfonic acid, 4-amino-2',6'-dinitrodiphenylamine-4'-sulfonic acid or 3-amino-4'-nitrodiphenylamine-2'-sulfonic acid or a mixture of these compounds.

14. The process as claimed in claim 3, wherein the starting aminonitrodiphenylaminesulfonic acid is 4-amino-4'-nitrodiphenylamine-2'-sulfonic acid, 4-amino-2'-nitrodiphenylamine-4'-sulfonic acid, 4-amino-2',4'-dinitrodiphenylamine-6'-sulfonic acid, 4-amino-2',6'-dinitrodiphenylamine-4'-sulfonic acid or 3-amino-4'-nitrodiphenylamine-2'-sulfonic acid or a mixture of these compounds.

15. The process as claimed in claim 2, wherein the starting aminonitrodiphenylaminesulfonic acid is a 4-amino-(nitrodiphenylaminesulfonic acid).

16. The process as claimed in claim 3, wherein the starting aminonitrodiphenylaminesulfonic acid is a 4-amino-(nitrodiphenylaminesulfonic acid).

17. The process as claimed in claim 2, wherein the oxidizing agent used in potassium permanganate.

18. The process as claimed in claim 3, wherein the oxidizing agent used in potassium permanganate.

19. The process as claimed in claim 4, wherein the oxidizing agent used is potassium permanganate.

20. The process as claimed in claim 7, wherein the oxidizing agent used is potassium permanganate.

* * * * *